(12) United States Patent
Moore et al.

(10) Patent No.: US 10,761,933 B2
(45) Date of Patent: Sep. 1, 2020

(54) PREFILL OF RAID STRIPES IN A STORAGE SYSTEM BY READING OF EXISTING DATA

(71) Applicant: EMC IP Holding Company LLC, Hopkinton, MA (US)

(72) Inventors: William F. Moore, Attleboro, MA (US); Anton Kucherov, Dudley, MA (US); Boaz Binia, Framingham, MA (US); Zvi Schneider, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/446,138

(22) Filed: Jun. 19, 2019

(65) Prior Publication Data

US 2020/0097393 A1 Mar. 26, 2020

Related U.S. Application Data

(60) Provisional application No. 62/734,671, filed on Sep. 21, 2018.

(51) Int. Cl.
*G06F 12/00* (2006.01)
*G06F 11/10* (2006.01)
(Continued)

(52) U.S. Cl.
CPC .......... *G06F 11/1076* (2013.01); *G06F 3/064* (2013.01); *G06F 3/0604* (2013.01);
(Continued)

(58) Field of Classification Search
CPC .. G06F 11/1076; G06F 3/0689; G06F 3/0635; G06F 3/0643; G06F 3/0619;
(Continued)

(56) References Cited

U.S. PATENT DOCUMENTS 7,444,464 B2   10/2008   Urmston et al.
8,095,726 B1   1/2012    O'Connell et al.
(Continued)

FOREIGN PATENT DOCUMENTS

WO   2016111954 A1   7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Mark A Giardino, Jr.
(74) *Attorney, Agent, or Firm* — Ryan, Mason & Lewis, LLP

(57) ABSTRACT

A storage system comprises a plurality of storage nodes each comprising one or more storage devices. At least a given one of the storage nodes is configured to read data blocks from its one or more storage devices, and for a given one of the data blocks, to determine based at least in part on a content-based signature of that data block whether or not the given data block is appropriate for use in a prefilling operation of the given storage node. Responsive to the given data block being appropriate for use in the prefilling operation of the given storage node, the given storage node uses the data block in the prefilling operation of the given storage node. Responsive to the given data block not being appropriate for use in the prefilling operation of the given storage node, the given storage node sends the data block to another one of the storage nodes for use in a prefilling operation of that other storage node.

20 Claims, 15 Drawing Sheets

(51) Int. Cl.
  *G06F 3/06*    (2006.01)
  *G06F 11/30*   (2006.01)
  *G06F 12/02*   (2006.01)
  *G06F 12/0802* (2016.01)
  *G06F 13/00*   (2006.01)
  *G06F 13/28*   (2006.01)

(52) U.S. Cl.
  CPC .......... *G06F 3/0619* (2013.01); *G06F 3/0631* (2013.01); *G06F 3/0635* (2013.01); *G06F 3/0643* (2013.01); *G06F 3/0644* (2013.01); *G06F 3/0689* (2013.01); *G06F 11/1088* (2013.01); *G06F 11/3034* (2013.01); *G06F 12/023* (2013.01); *G06F 12/0802* (2013.01)

(58) Field of Classification Search
  CPC .. G06F 11/3034; G06F 3/0631; G06F 3/0604; G06F 11/1088; G06F 12/023; G06F 3/064; G06F 3/0644; G06F 12/0802
  See application file for complete search history.

(56) References Cited

U.S. PATENT DOCUMENTS

| | | | |
|---|---|---|---|
| 8,214,612 | B1 | 7/2012 | Natanzon |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 9,891,994 | B1 | 2/2018 | Schneider et al. |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2013/0036277 | A1* | 2/2013 | Szczepkowski .... G06F 12/0811 711/159 |
| 2013/0275671 | A1* | 10/2013 | Domsch ................ G06F 3/0604 711/114 |
| 2013/0325624 | A1 | 12/2013 | Shoens |
| 2014/0181016 | A1 | 6/2014 | Whitehead et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2017/0192857 | A1 | 7/2017 | Meiri et al. |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

U.S. Appl. No. 16/049,185, filed in the name of Zvi Schneider et al. Jul. 30, 2018 and entitled "Efficient Computation of Parity Data in Storage System Implementing Data Striping."

* cited by examiner

| D0 | D1 | D2 | D3 | D4 | P | Q̄ |
|---|---|---|---|---|---|---|
| DATA | DATA | DATA | DATA | DATA | ROW PARITY | DIAGONAL PARITY AND COLUMN PARITY |
| DATA | DATA | DATA | DATA | DATA | ROW PARITY | DIAGONAL PARITY AND COLUMN PARITY |
| DATA | DATA | DATA | DATA | DATA | ROW PARITY | DIAGONAL PARITY AND COLUMN PARITY |
| DATA | DATA | DATA | DATA | DATA | ROW PARITY | DIAGONAL PARITY AND COLUMN PARITY |

FIG. 6

| (data) SSD 1 | (data) SSD2 | (data) SSD3 | ......... | (data) SSD33 | (data) SSD34 | P SSD35 | Q SSD36 |
|---|---|---|---|---|---|---|---|
| T | T | T | | F | F | $p_1$ | $\bar{q}_1$ |
| F | T | F | | T | T | $p_2$ | $\bar{q}_2$ |
| : | : | : | : | : | : | : | : |
| T | F | T | | T | T | $p_{38}$ | $\bar{q}_{38}$ |
| T | T | F | | T | F | $p_{39}$ | $\bar{q}_{39}$ |
| T | T | T | | T | T | $p_{40}$ | $\bar{q}_{40}$ |

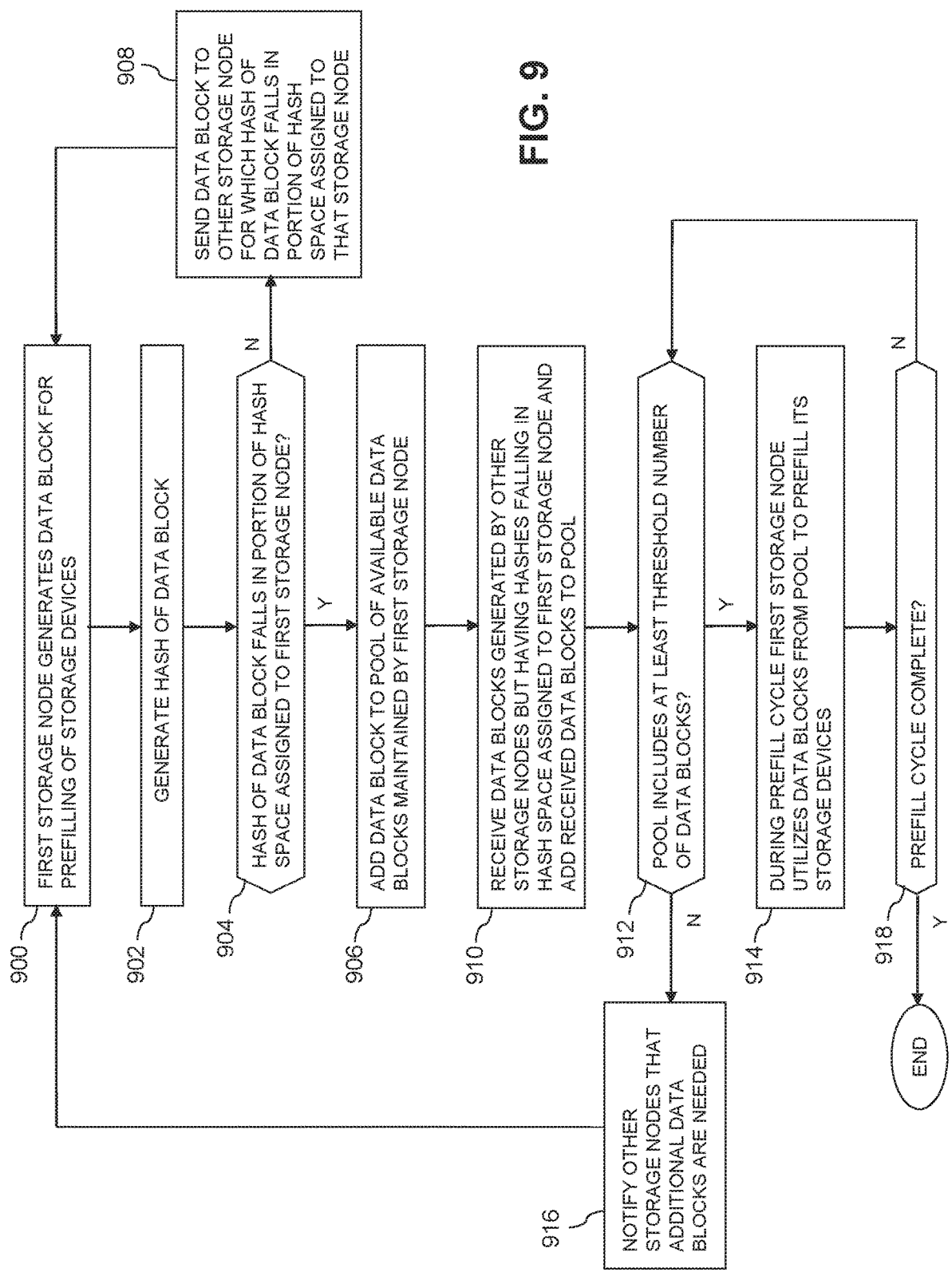

FIG. 10A

ADDRESS-TO-HASH (A2H) TABLE 1000

| Table Key | | |
|---|---|---|
| LOGICAL ADDRESS 1 | HASH HANDLE OF DATA PAGE | OTHER FIELDS |
| LOGICAL ADDRESS 2 | HASH HANDLE OF DATA PAGE | OTHER FIELDS |
| ... | ... | ... |
| LOGICAL ADDRESS M | HASH HANDLE OF DATA PAGE | OTHER FIELDS |

1002

HASH-TO-DATA (H2D) TABLE

| HASH HANDLE 1 | PHYSICAL OFFSET OF DATA PAGE | OTHER FIELDS |
| HASH HANDLE 2 | PHYSICAL OFFSET OF DATA PAGE | OTHER FIELDS |
| ... | | |
| HASH HANDLE D | PHYSICAL OFFSET OF DATA PAGE | OTHER FIELDS |

TABLE KEY

HASH METADATA (HMD) TABLE

| HASH HANDLE 1 | REF COUNT 1 | PHYSICAL OFFSET OF DATA PAGE |
| HASH HANDLE 2 | REF COUNT 2 | PHYSICAL OFFSET OF DATA PAGE |
| ... | | |
| HASH HANDLE H | REF COUNT H | PHYSICAL OFFSET OF DATA PAGE |

TABLE KEY

PHYSICAL LAYER BASED (PLB) TABLE (1006)

| | | |
|---|---|---|
| PHYSICAL OFFSET 1 | HASH DIGEST OF DATA PAGE | OTHER FIELDS |
| PHYSICAL OFFSET 2 | HASH DIGEST OF DATA PAGE | OTHER FIELDS |
| ... | ... | ... |
| PHYSICAL OFFSET P | HASH DIGEST OF DATA PAGE | OTHER FIELDS |

TABLE KEY (PHYSICAL OFFSET column)

PREFILL OF RAID STRIPES IN A STORAGE SYSTEM BY READING OF EXISTING DATA

RELATED APPLICATION(S)

The present application claims priority to U.S. Provisional patent application Ser. No. 62/734,671, filed Sep. 21, 2018 and entitled "Distributed Generation of Random Data in a Storage System," which is incorporated by reference herein in its entirety. The present application is also related to U.S. patent application Ser. No. 16/446,183, filed concurrently herewith and entitled "Distributed Generation of Random Data in a Storage System," and U.S. patent application Ser. No. 16/446,161, filed concurrently herewith and entitled "Automatic Prefill of a Storage System with Conditioning of RAID Stripes," each also claiming priority to the above-cited U.S. Provisional application Ser. No. 62/734,671, and incorporated by reference herein in its entirety.

FIELD

The field relates generally to information processing systems, and more particularly to storage in information processing systems.

BACKGROUND

In many storage systems, data is distributed across multiple storage devices in accordance with redundant array of independent disks (RAID) arrangements. Some RAID arrangements allow a certain amount of lost data to be rebuilt from parity information, typically in response to a storage device failure or other type of failure within the storage system. It is desirable in certain contexts to be able to "prefill" at least a portion of a RAID array with random data. For example, such prefilling is desirable prior to performing various performance tests at regular intervals, including while varying the hardware or software used on that RAID array. Due to the nature of a RAID array, its performance can be drastically different based on how full the array is and whether or not the individual blocks have been used previously. Unfortunately, conventional techniques for prefilling the RAID array with suitable amounts and types of data are inefficient and unduly time consuming.

SUMMARY

Illustrative embodiments provide techniques for prefill of RAID stripes in a storage array or other type of storage system by reading of existing data. For example, such embodiments can avoid the drawbacks of conventional approaches, providing highly efficient mechanisms for prefilling of a RAID array with appropriate amounts and types of data. As a result, performance testing is more accurate and can be performed more quickly than would otherwise be possible using the conventional approaches.

In one embodiment, a storage system comprises a plurality of storage nodes each comprising one or more storage devices. Each of the storage nodes further comprises a processor coupled to a memory. At least a given one of the storage nodes is configured to read data blocks from its one or more storage devices, and for a given one of the data blocks, to determine based at least in part on a content-based signature of that data block whether or not the given data block is appropriate for use in a prefilling operation of the given storage node. Responsive to the given data block being appropriate for use in the prefilling operation of the given storage node, the given storage node uses the data block in the prefilling operation of the given storage node. Responsive to the given data block not being appropriate for use in the prefilling operation of the given storage node, the given storage node sends the data block to another one of the storage nodes for use in a prefilling operation of that other storage node.

These and other illustrative embodiments include, without limitation, apparatus, systems, methods and processor-readable storage media.

BRIEF DESCRIPTION OF THE DRAWINGS

FIG. 6 is a table showing distribution of data blocks in the FIG. 5 RAID 6 array.

FIG. 7 is a table showing an example of a stripe of a RAID 6 array with free pages and taken pages with which one or more illustrative embodiments can be implemented.

FIG. 9 is a flow diagram of a process for distributed generation of data for prefilling of storage devices in an illustrative embodiment.

FIGS. 10A, 10B, 10C and 10D show examples of logical layer and physical layer mapping tables in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
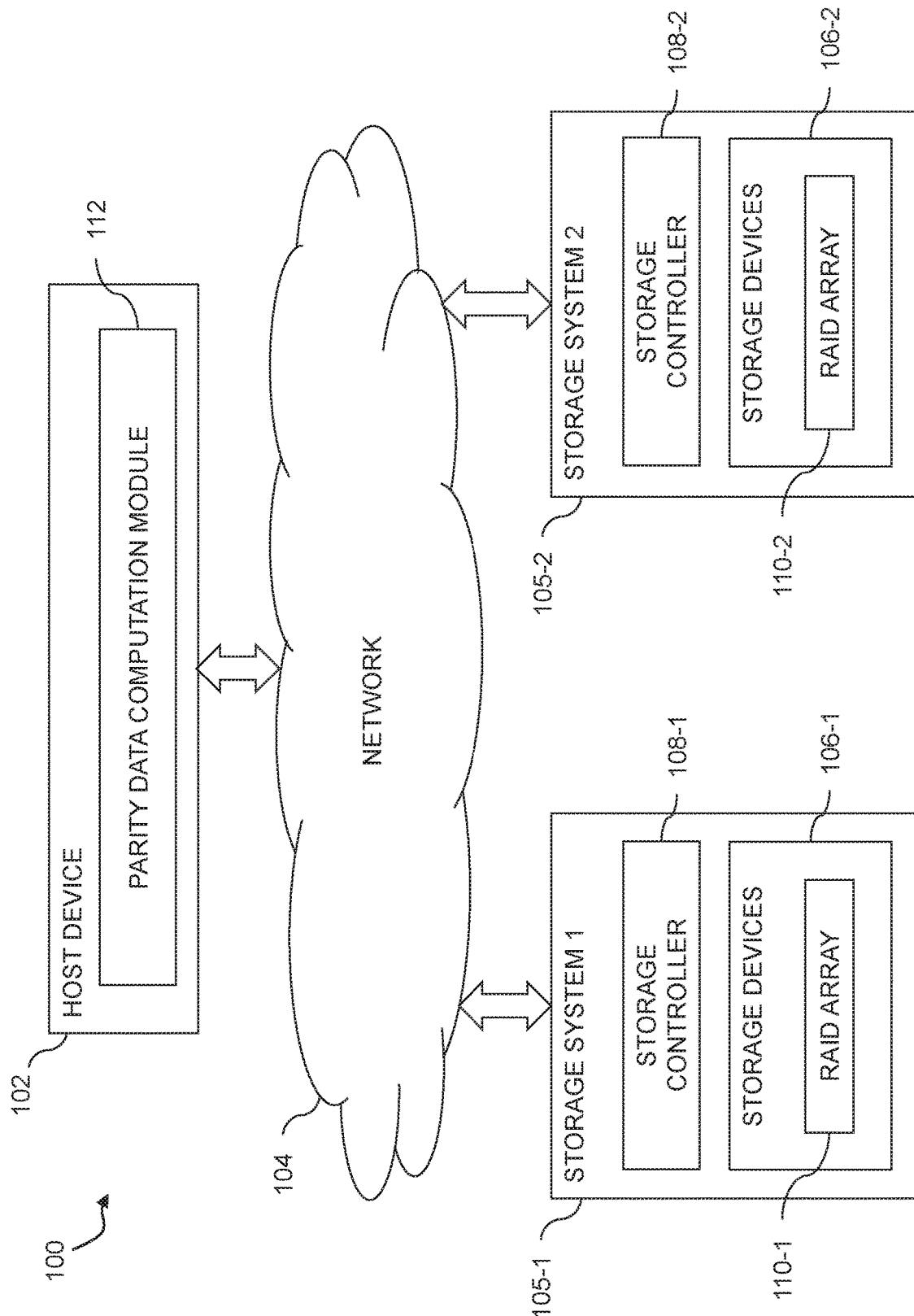
FIG. 1 is a block diagram of one example of an information processing system within which one or more illustrative embodiments are implemented.

FIG. 1 shows an information processing system 100 configured in accordance with an illustrative embodiment. The information processing system 100 comprises a host device 102, which may comprise one of a plurality of host devices of a computer system. The host device 102 communicates over a network 104 with first and second storage systems 105-1 and 105-2, also denoted as Storage System 1 and Storage System 2, respectively. The storage systems 105-1 and 105-2 are collectively referred to herein as storage systems 105. The host device 102 and storage systems 105 may be part of an enterprise computing and storage system, a cloud-based system or another type of system.

The host device 102 and storage systems 105 illustratively comprise respective processing devices of one or more processing platforms. For example, the host device 102 and the storage systems 105 can each comprise one or more processing devices each having a processor and a memory, possibly implementing virtual machines and/or containers, although numerous other configurations are possible.

The host device 102 and the storage systems 105 can additionally or alternatively be part of cloud infrastructure such as an Amazon Web Services (AWS) system. Other examples of cloud-based systems that can be used to provide one or more of host device 102 and storage systems 105 include Google Cloud Platform (GCP) and Microsoft Azure.

The host device 102 is configured to write data to and read data from the storage systems 105. The host device 102 and the storage systems 105 may be implemented on a common processing platform, or on separate processing platforms. A wide variety of other types of host devices can be used in other embodiments.

The host device 102 in some embodiments illustratively provides compute services such as execution of one or more applications on behalf of each of one or more users associated with the host device 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, an infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a Win or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage systems 105 are accessible to the host device over the network 104. The storage system 105-1 comprises a plurality of storage devices 106-1 and an associated storage controller 108-1. Similarly, the storage system 105-2 comprises a plurality of storage devices 106-2 and an associated storage controller 108-2. The storage devices 106-1 and 106-2 are collectively referred to herein as storage devices 106. The storage controllers 108-1 and 108-2 are collectively referred to as storage controllers 108.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives (HDDs). The particular storage devices used in a given storage tier may be varied in other embodiments, and multiple distinct storage device types may be used within a single storage tier. The term "storage device" as used herein is intended to be broadly construed, so as to encompass, for example, flash drives or other types of SSDs, HDDs, hybrid drives or other types of storage devices.

In some embodiments, at least one of the storage systems 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement one or both of storage systems 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

In the FIG. 1 embodiment, the storage devices 106 implement one or more RAID arrays, denoted as RAID array 110-1 for storage devices 106-1 of storage system 105-1 and RAID array 110-2 for storage devices 106-2 of storage system 105-2. The RAID arrays 110-1 and 110-2 may collectively form a single larger RAID array, with the RAID arrays 110 representing different portions of that single larger RAID array, or may instead be viewed as representing entirely distinct and separate RAID arrays. The RAID arrays 110 are assumed to store data in stripes across a plurality of SSDs provided by the storage devices 106. The RAID arrays 110 implement examples of what is more generally referred to herein as data striping across a plurality of storage devices in a storage system.

The host device 102 in the FIG. 1 embodiment includes a parity data computation module 112 which provides logic and functionality for computing parity data in a storage system that implements data striping across a plurality of storage devices (e.g., in RAID arrays 110 on storage devices 106). Parity data computation will be described in further detail below. The host device 102 should also be understood to include additional modules and other components typically found in conventional implementations of computers, servers or other host devices, although such additional modules and other components are omitted from the figure for clarity and simplicity of illustration.

The host device 102 and storage systems 105 in the FIG. 1 embodiment are assumed to be implemented using at least one processing platform each comprising one or more processing devices each having a processor coupled to a memory. Such processing devices can illustratively include particular arrangements of compute, storage and network resources.

The host device 102 and the storage systems 105 may be implemented on respective distinct processing platforms, although numerous other arrangements are possible. For example, in some embodiments at least portions of the host device 102 and one or both of the storage systems 105 are implemented on the same processing platform. The storage systems 105 can therefore be implemented at least in part within at least one processing platform that implements at least a portion of the host device 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host device 102 and storage systems 105 to reside in different data centers. Numerous other distributed implementations of one or both of the host device 102 and the storage systems 105 are possible. Accordingly, the storage systems 105 can also be implemented in a distributed manner across multiple data centers.

Additional examples of processing platforms utilized to implement host devices and/or storage systems in illustrative embodiments will be described in more detail below in conjunction with FIGS. 11 and 12.

It is to be appreciated that these and other features of illustrative embodiments are presented by way of example only, and should not be construed as limiting in any way.

Accordingly, different numbers, types and arrangements of system components such as host device 102, network 104, storage systems 105, storage devices 106, storage controllers 108, and RAID arrays 110 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. Additional examples of systems implementing functionality for parity data computation in accordance with data striping will be described below.

Figure 2:
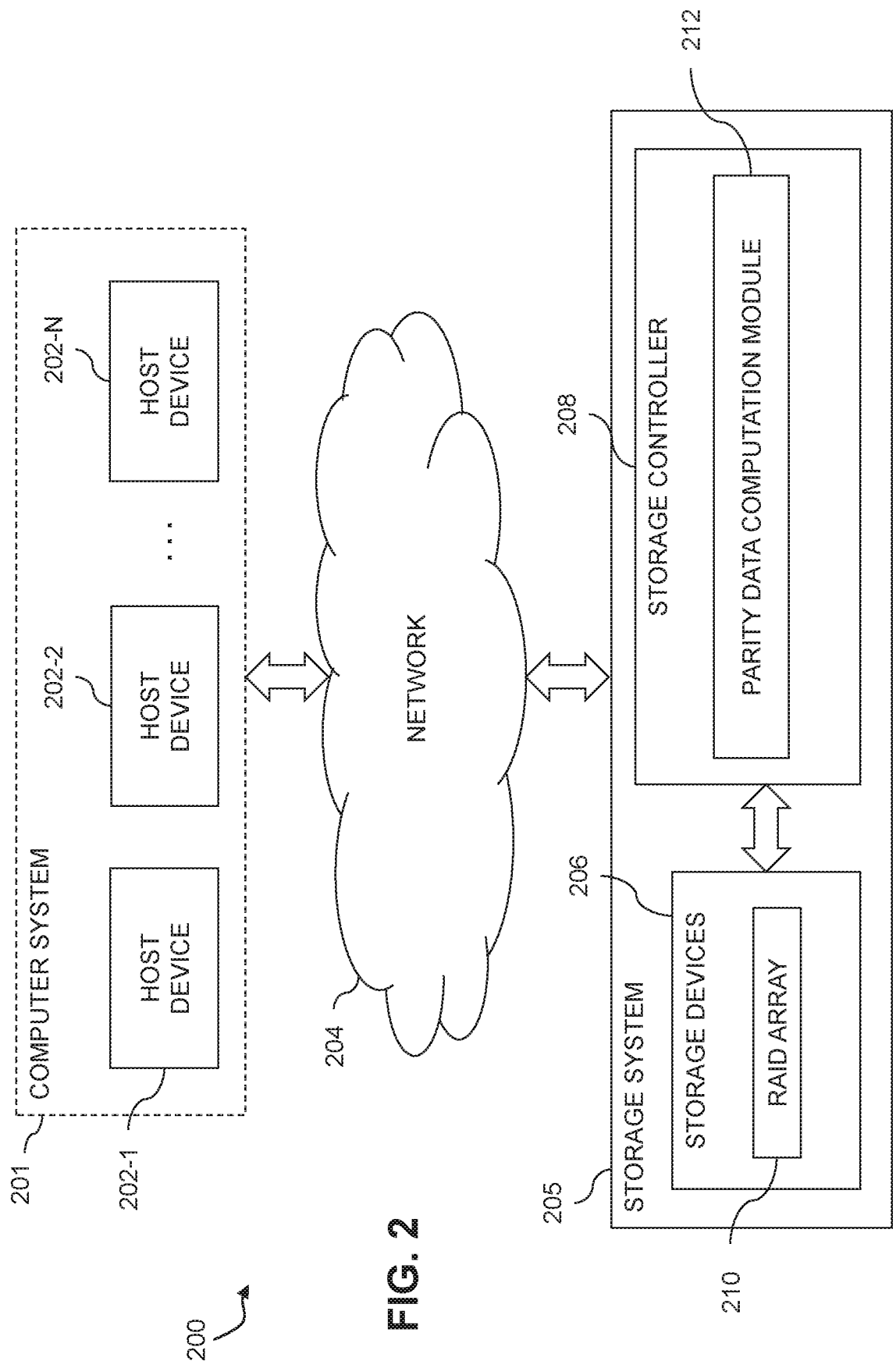
FIG. 2 is a block diagram of another example of an information processing system within which one or more illustrative embodiments are implemented.

FIG. 2 shows an information processing system 200 configured in accordance with another illustrative embodiment. The information processing system 200 comprises a computer system 201 that includes host devices 202-1, 202-2, . . . 202-N collectively referred to as host devices 202. The host devices 202 communicate over a network 204 with a storage system 205. The computer system 201 is assumed to comprise an enterprise computer system, cloud-based computer system or other arrangement of multiple compute nodes associated with respective users. The host devices 202 of the computer system 201 in some embodiments illustratively provide compute services such as execution of one or more applications on behalf of each of one or more users associated with respective ones of the host devices 202.

Similar to the storage systems 105 of system 100, the storage system 205 comprises storage devices 206, storage controller 208 and RAID array 210. However, in this embodiment, the functionality for parity data computation associated with data striping in RAID array 210 is implemented in the storage system 205, rather than in one of the host devices 202. Accordingly, the storage controller 208 in this embodiment comprises parity data computation module 212, which is configured to operate in substantially the same manner as that described above for corresponding module 112 of the host device 102 in the system 100.

In some embodiments, functionality for parity data computation associated with data striping can be implemented partially in a host device and partially in the storage system. For example, U.S. patent application Ser. No. 16/049,185, filed Jul. 30, 2018 and entitled "Efficient Computation of Parity Data in Storage System Implementing Data Striping," which is incorporated by reference herein in its entirety, discloses arrangements for utilizing processing capabilities on the storage devices 106 themselves to perform a portion of a parity data computation, results of which are then used for parity data computations on the host device (e.g., module 112) and/or the storage controller (e.g., module 212). Accordingly, illustrative embodiments are not limited to arrangements in which all such functionality is implemented in a host device or a storage system, and therefore encompass various hybrid arrangements in which the functionality is distributed over one or more host devices and one or more storage systems, each comprising one or more processing devices.

Illustrative data striping operations with associated parity data computations in accordance with RAID based techniques will now be described in further detail in the context of the information processing systems 100 and 200. However, it is to be understood that data striping operations with associated parity data computations are more generally applicable to other types of information processing systems. At least some of the parity data computation steps are illustratively performed under the control of the parity data computation module 112 in host device 102 of system 100 or in module 212 in storage controller 208 of system 200.

Data striping in some embodiments is implemented utilizing RAID, such as via RAID arrays 110 on storage systems 105. In such embodiments, the number of data disks in the RAID storage system may comprise a prime number k, and a column of the RAID storage system comprises k−1 blocks. The storage devices of the RAID storage system may be SSDs. The RAID storage system may implement RAID 6 with the number of data disks being k and the number of parity disks being n, where n is greater than one (e.g., where n=2). In some embodiments, the stripe column size is selected as a multiple of a designated block size. The multiple may be a prime number minus 1. The prime number may be the same as or different than the prime numbers selected for different ones of the stripes.

In some cases, the prime number selected for a particular stripe may be greater than a number of the plurality of storage devices in the storage system that store data blocks for that stripe. To handle such situations, the parity blocks for the stripe may be computed by assuming or setting a set of virtual storage devices with pages storing designated predetermined values (e.g., zero pages). The particular number of virtual storage devices in the set may be equal to the difference between the prime number selected for that stripe and the number of storage devices in the storage system which store data blocks for that stripe.

The term RAID, as used herein, is an umbrella term for computer data storage schemes that can divide and replicate data among multiple physical disk drives. References to one or more "disks" in illustrative embodiments disclosed herein are intended to be broadly construed, and are not limited to HDDs or other rotational media. For example, "disks" as that term is broadly used herein is intended to encompass other types of storage drives such as SSDs. The terms "disks" and "drives" will therefore be used interchangeably herein. The physical disks are said to be in a RAID array, which is accessed by an operating system as one single disk. The different schemes or architectures are named by the word RAID followed by a number (e.g., RAID 0, RAID 1, etc.). Each scheme provides a different balance between the goals of increasing data reliability and increasing input/output performance.

The RAID 6 scheme was developed to provide functionality for recovering from multiple disk failures (e.g., similar to RAID 1.3) with high utilization rates (e.g., comparable to RAID 4 and 5) that avoids system bottlenecks. RAID 6 uses an N+2 parity scheme, which allows failure of two disks, where N is the number of disks in the array. RAID 6 defines block-level striping with double distributed parity and provides fault tolerance of two drive failures, so that the array continues to operate with up to two failed drives, irrespective of which two drives fail.

There are various implementations of RAID 6, which may use varying coding schemes. As the term is used herein, RAID 6 is defined as any N+2 coding scheme which tolerates double disk failure, while user data is kept in the clear. This additional requirement assures that user reads are not affected by the RAID scheme under normal system operation. Examples of RAID 6 schemes include those that utilize the Reed Solomon error correction code and those that utilize parity bits, such as those wherein N data disks are supported by two redundancy disks each holding a different parity bit. It should be noted that if all parity bits are on the same two disks, then the performance may be subject to bottlenecks. This can be solved by use of distributed parity stripes over N+2 disks similar to that specified in RAID 5.

Examples of coding schemes based on parity calculations of rows and diagonals in a matrix of blocks include Even/Odd and Row Diagonal Parity (RDP). Both of these schemes utilize a first parity disk P that holds the parities of rows of blocks as well as a second parity disk Q that contains blocks that hold the parity of diagonals of data blocks. In both schemes, it is advantageous to work with a block size that is smaller than the native page size. For example, the native page size may be 8 KB, while the block size is smaller but evenly divisible into 8 KB, e.g., 0.5 KB, 1 KB, 2 KB, 4 KB. In an example where the native page size is 8 KB and the block size is 2 KB, each stripe thus may contain four rows, and thus the four blocks present on each disk form a single native page. However, a stripe can also be defined by multiple rows of blocks distributed across the storage devices of the RAID array. It is assumed that pages are read and written using a single disk operation.

Figure 3:
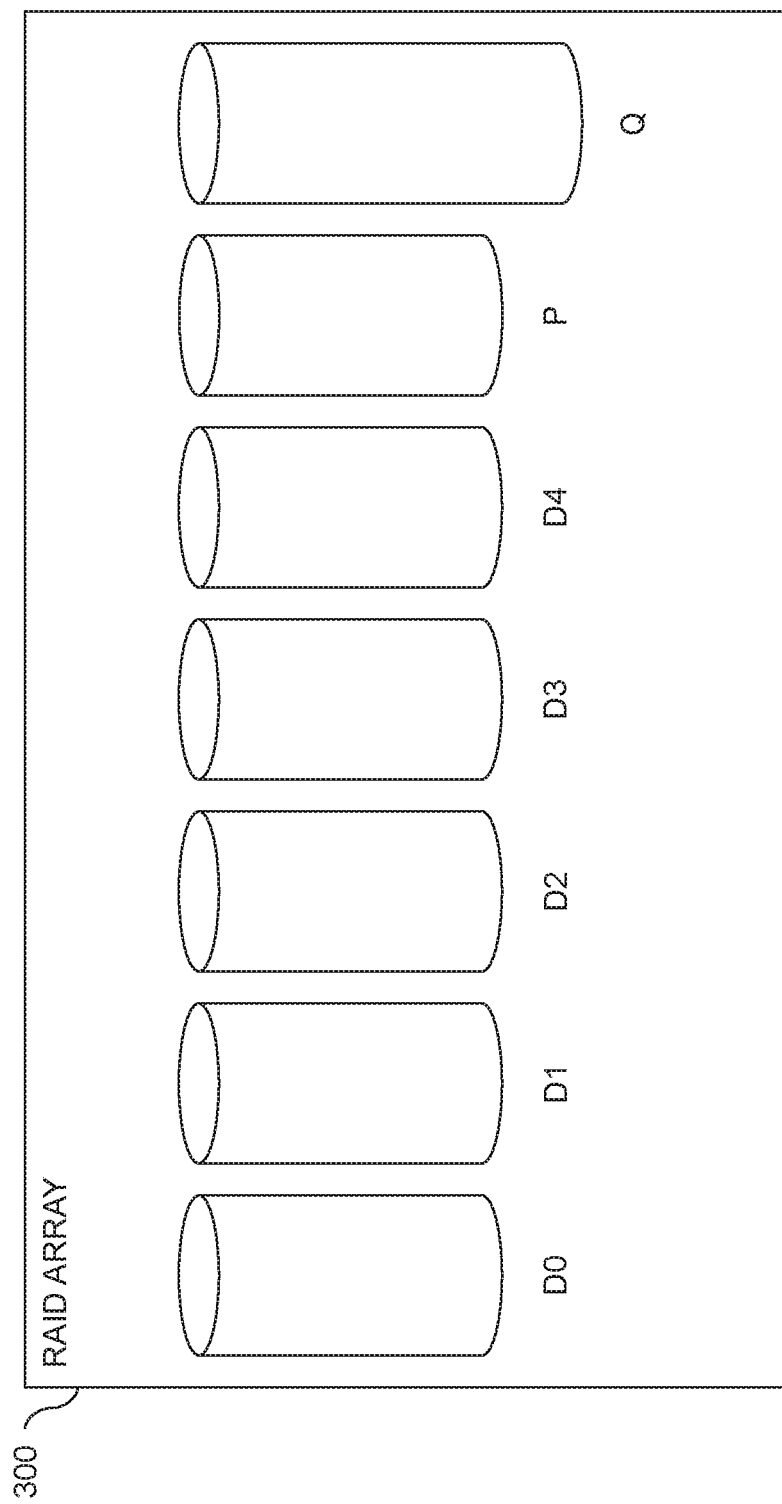
FIG. 3 is a block diagram illustrating an example of a RAID 6 array for implementation in the FIG. 1 system or the FIG. 2 system.

FIG. 3 shows a RAID array 300, which in this example includes five data disks denoted D0 through D4. A storage controller such as storage controllers 108 or storage controller 208) is configured for writing initial data into the array 300, and for updating existing data in the array 300. The storage controller further provides functionality for recovering data after single or double disk failure.

Each of the disks in the array 300 stores a column of data blocks. The same data block in successive disks forms a row, which is to say the rows cross the disks. The data storage blocks are stored alongside parity data blocks in parity disks denoted P and Q, and the numbers of data blocks in the different columns or disks may be different. Row parity blocks are placed in a row parity column in disk P, and the diagonal parity data is placed in diagonal parity blocks in disk Q. Note that parity data stored in parity disks P and Q is computed in accordance with parity data computation module 112 (FIG. 1 system) or parity data computation module 212 (FIG. 2 system).

In the case of five data columns and four data rows, the number of diagonals is one greater than the number of rows. Thus, the diagonal parity column in disk Q includes one more block than the other columns for disks D0 through D4 and the row parity disk P. This is illustrated in FIG. 3 as Q is "taller" than D0 through D4 and P.

The number of data columns is a prime number, and the number of rows is one less than that prime number (e.g., in the FIG. 3 example the prime number is 5 corresponding to the five data disks D0 through D4). It should be noted that, in practice, the various columns are distributed over the available physical disks to avoid system bottlenecks.

Figure 4:
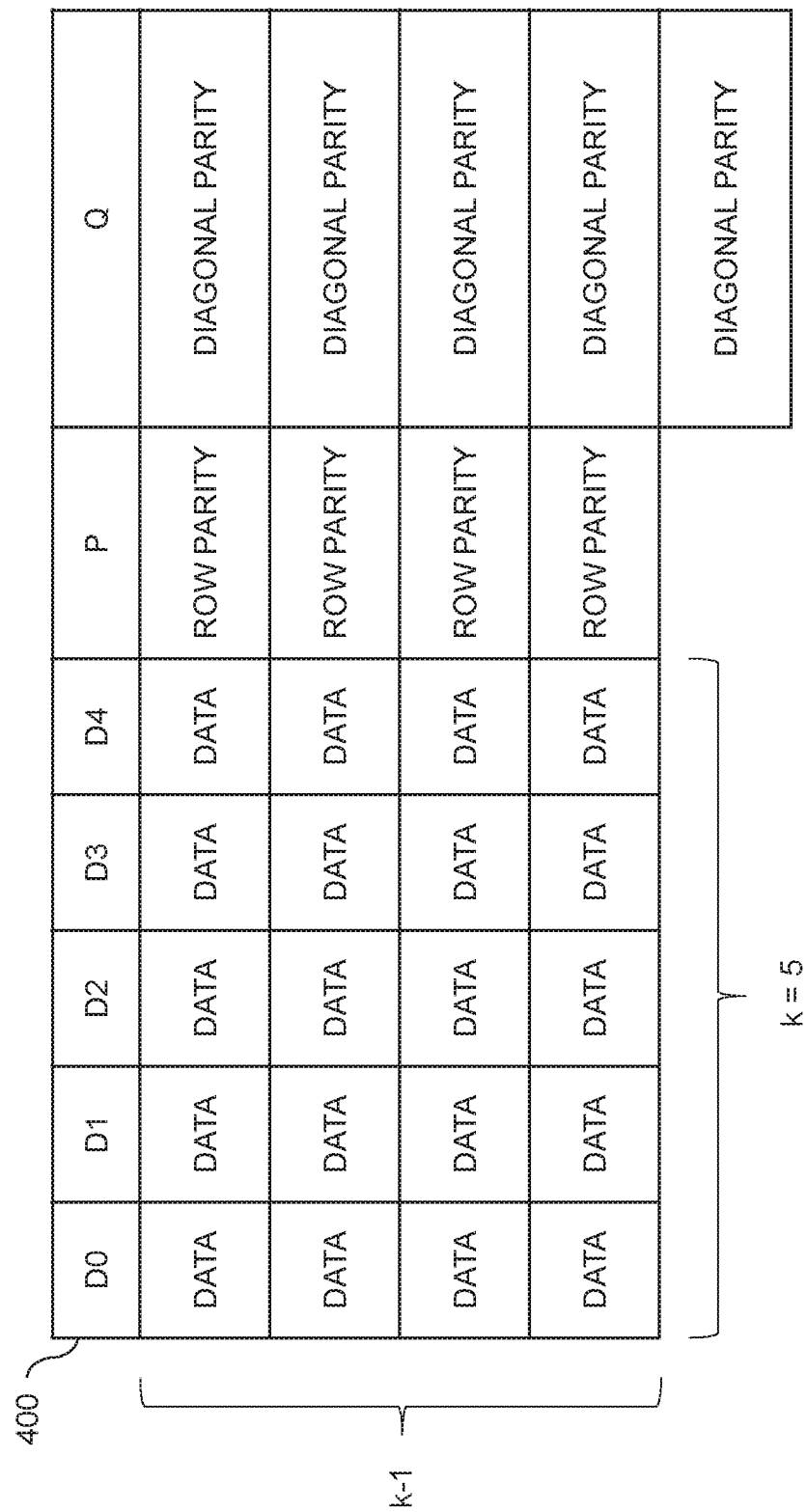
FIG. 4 is a table showing distribution of data blocks in the FIG. 3 RAID 6 array.

FIG. 4 shows a table 400 illustrating one example distribution of data blocks in the RAID array 300. In this case, there are k data disks, where k=5 is a prime number and there are five data columns corresponding to disks D0 through D4. There are four rows (e.g., k−1). The P column includes the same four rows as the data columns D0 through D4, but the Q column has an extra row.

In one example, each stripe is considered to contain k (where k must be prime) data columns D0 through D4, and two parity columns P and Q. The stripe is composed of a quasi-matrix of blocks, which contains k−1 rows. Column P contains k−1 blocks, each providing the parity of the k data disk blocks in its row. The k by k−1 matrix made up of the blocks in the data columns includes k diagonals each of size k−1. Column Q, in contrast with the rest of the columns, contains k blocks and not k−1. Each of the k blocks in disk Q holds the parity of one of the k diagonals. It should be noted that the ordering of blocks within each column may be arbitrary. Furthermore, the extra block in column Q may be placed in a data column which does not contain a data block in the diagonal of which this block is the parity. Also, some of the rows may be blank.

It should be appreciated that there are various other ways to distribute data blocks in an array such as RAID array 300. For example, in sonic cases it may be desired to provide more than one row parity column, which results in higher capacity overhead but which allows for a faster rebuild after a single disk failure.

Additional details regarding the above-described techniques of FIGS. 3 and 4 for storing data in RAID arrays are disclosed in U.S. Pat. No. 9,552,258, entitled "Method and System for Storing Data in RAID Memory Devices," which is incorporated by reference herein.

Figure 5:
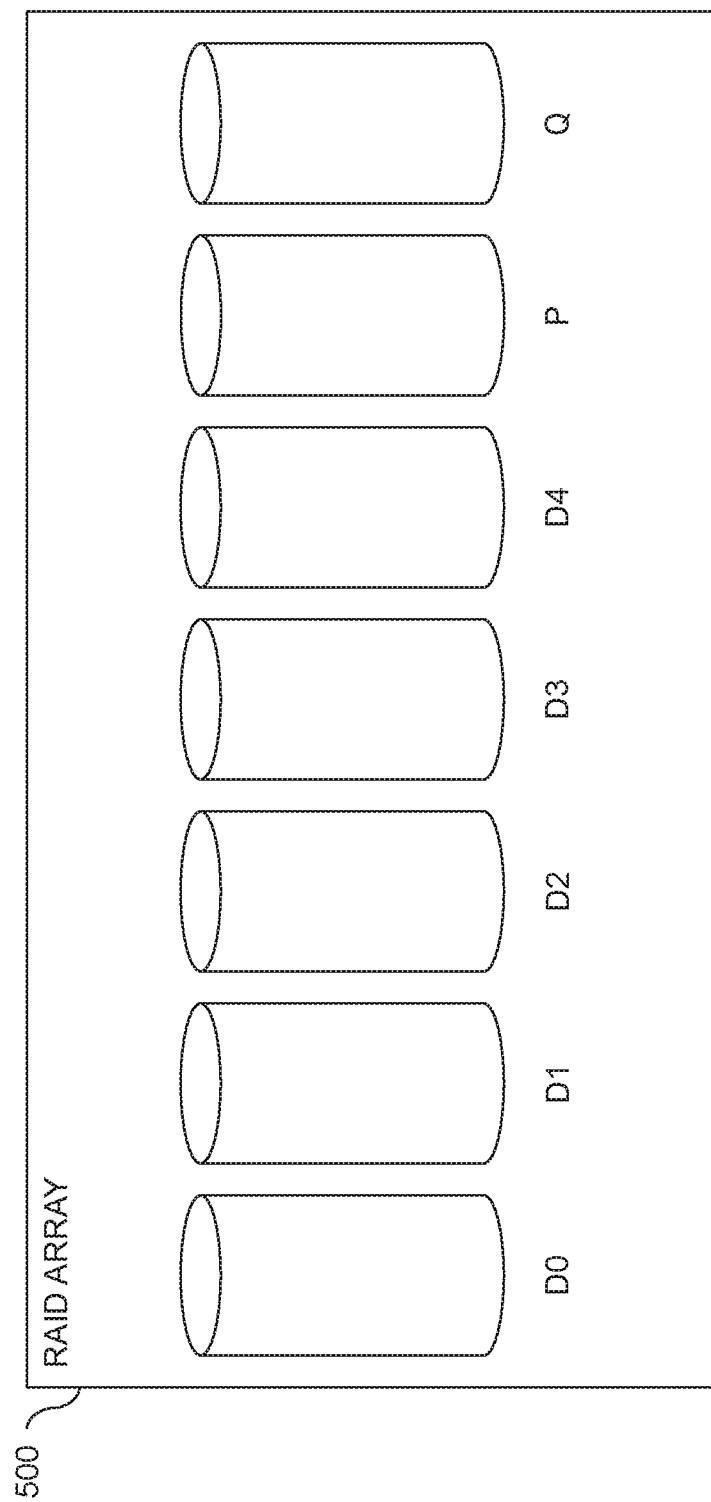
FIG. 5 is a block diagram illustrating another example of a RAID 6 array for implementation in the FIG. 1 system or the FIG. 2 system.

FIG. 5 shows a RAID array 500 which, similar to RAID array 300 in FIG. 3, includes five data disks denoted D0 through D4. Similarly, a storage controller (e.g., such as storage controllers 108 or storage controller 208) is configured for writing initial data into the array 500, and for updating existing data in the array 500. The storage controller further provides functionality for recovering data after single or double disk failure.

Similar to array 300, each of the disks in the array 500 stores a column of data blocks. The same data block in successive disks forms a row. Further, the data storage blocks are stored alongside parity data blocks in parity disks denoted P and Q, where row parity blocks are placed in a row parity column in disk P, and the diagonal parity data is placed in parity blocks in disk Q. Note again that parity data stored in parity disks P and Q is computed in accordance with parity data computation module 112 (FIG. 1 system) or parity data computation module 212 (FIG. 2 system).

Recall that in array 300, the diagonal parity column in disk Q includes one more block than the other columns for disks D0 through D4 and the row parity disk P (i.e., in the case of five data columns and four data rows, the number of diagonals is one greater than the number of rows). However, in array 500, Q has the same number of blocks as D0 through D4 and P and therefore is the same size as the other disks, as illustrated in FIG. 5. This is because array 500 utilizes "column parity data" that is computed and combined with diagonal parity data to eliminate the extra block in disk Q. Computation of column parity data will be further explained below.

FIG. 6 shows a table 600 illustrating one example distribution of data blocks in the RAID array 500. The implementation of FIGS. 5 and 6 is referred to as an updated RAID 6 implementation. In this case, as with table 400 for array 300, there are k data disks, where k=5 is a prime number and there are five data columns corresponding to disks D0 through D4. There are four rows (e.g., k−1). The P column includes the same four rows as the data columns D0 through D4, but in this embodiment, unlike table 400, the Q column has the same number of rows as D0 through D4 and P.

In table 600, row parity data and diagonal parity data are computed as described above with respect to table 400. However, parity computation in the embodiment of FIGS. 5 and 6 avoids the extra block in disk Q by adding per column parity to the diagonals. This approach introduces an additional cost of the need to calculate the column parity. Column parity provides an updated RAID 6 scheme as follows:

Let S be a stripe and mark $S_{i,j}$:=the block in row i column j.

For every disk j column of the stripe, let $d_j := \bigoplus_{i=1}^{p-1} S_{i,j} \forall i \in \{1 \ldots p-1\}$.

Define $p_i$:=parity of row i and $q_i$:=parity of diagonal i. By diagonal i, we refer to the diagonal that is not intersecting with column i (as explained above, non-existent columns are just considered as predefined zeros).

Let $q_p$ be the extra Q block.

Define $\bar{q}_k := q_k \oplus d_k$ where the symbol $\oplus$ refers to an XOR operation. The XOR operation is a Boolean operation used at the binary level to create RAID parity. This operation is the exclusive disjunction operation also known as exclusive OR (XOR). In the XOR operation (also referred to as XOR'ing, performing XOR, XOR computation, etc.), binary data is passed through logic that embodies the XOR operation and results in a binary result, which is used for redundancy and error correction as described herein. In such case, the result of the XOR operation is referred to as parity data.

Thus, $q_k$ is referred to in table 600 as "diagonal parity" and $d_k$ is referred to as "column parity." As such, $q_k \oplus d_k$ is referred to in table 600 as "diagonal parity and column parity." Further, disk Q is denoted as $\bar{Q}$ in table 600.

Thus, given P and $\bar{Q}$, the updated RAID 6 implementation described in FIGS. 5 and 6 enables recovery from a double failure. In various embodiments, if a data disk and a Q parity disk fails, recovery in an updated RAID 6 implementation continues as normal.

In certain embodiments, if data disk i≠p and disk P fail, $d_1$ is known for all i≠j, and $d_i$ can be recovered from $\bar{q}_i$ since the diagonal i is not intersecting column i thus $q_i$ is known. In some embodiments, XOR'ing out the $d_j$ from $\bar{Q}$ bring us to the known recovery formula. In certain embodiments, if i=p then Q is known since all $d_j$ are known, and each block may be recovered from the diagonal.

In some embodiments, if two data disks fail (disk i and disk j) where neither failed disk is the parity disk P. the updated RAID 6 implementation enables recovery of the blocks using two steps. In one or more embodiments, a first step includes partially recovering each block.

$$\hat{S}_{k,i} = \hat{S}_{k,i} \oplus \{\text{either } d_i \text{ or } d_j\}$$

$$\hat{S}_{k,j} = \hat{S}_{k,j} \oplus \{\text{either } d_i \text{ or } d_j\}$$

In one or more embodiments, a second step includes XOR'ing out $d_i$ and $d_j$ to get the data block $S_{k,i}$ and $S_{k,j}$. Since p−1 is even, r and p−1−r are even/odd together, if r is even then an XOR on all blocks of the column i eliminates $d_j$ and $d_i$ and thus we will get $d_i$ and in the same way we can get $d_j$, and thus recover the data. If r is odd, then we get $\bigoplus_{i=1}^{r} S_{k,j} \oplus_{i=r+1}^{p-1-r} S_{k,j} \oplus d_j \oplus d_i = d_i$ thus we get $d_i$ and $d_j$ and we may continue recovery. In some embodiments, the case of i=p is just a special case with r=0.

In one or more embodiments, an updated RAID 6 implementation such as that depicted in FIGS. 5 and 6 provides many advantages. For example, a parity disk failure causes, at most, reading 2*P+1 blocks for double-degraded read. Still further, upon write of a single block, at most three parities are updated (row parity, diagonal parity, and the diagonal XOR'd with the column parity).

Note again that, in some embodiments, parity data stored in parity disks P and Q, including column parity data and the combined diagonal parity and column parity data, is computed in accordance with parity data computation module 112 (FIG. 1 system) or parity data computation module 212 (FIG. 2 system).

Additional details regarding the above-described techniques of FIGS. 5 and 6 for storing data in RAID arrays are disclosed in U.S. Pat. No. 9,891,994, entitled "Updated RAID 6 Implementation," which is incorporated by reference herein.

FIG. 7 shows a table 700 illustrating another example data striping distribution with column parity data combined with diagonal parity data as explained above in the context of FIGS. 5 and 6. In table 700, a stripe S is depicted with prime equal to 41 and 34 data disks SSD 1 through SSD 34. Note that it is assumed that the disks are SSDs. Further, SSD 35 is the row parity disk (disk P above) and SSD 36 is the combined diagonal party and column parity disk (disk $\overline{Q}$ above). Note that each block in the data disks is labeled either T for taken space (not available since the space contains data) or F for free space (available space since the space does not contain data).

One approach for calculating the column parity $d_j$ (column parity data) is: reading the column from the drive and performing the XOR operations with the diagonal parity data, as explained above, in the host device (e.g., module 112 in FIG. 1) or the storage controller (e.g., module 212 in FIG. 2); adding new pages instead of the old pages; and keeping all the rest of the data pages as they are. This introduces significant read amplification in case the stripe is not empty, as well as CPU consumption for the parity calculations (XOR operations).

For example, assume a page size is 8 KB, and a stripe has 40 rows and 34 data columns as in table 700, and assume the stripe is fifty percent full (50% of the blocks are non-free or taken (T) and 50% are free (F)). Then, there are about 680 pages free (pages that can be overwritten). If they are well distributed across the SSDs, this means there are 20 free pages in each column. For each column, the entire 20 (i.e., 40 minus 20) pages have to be read to recalculate the column (for the stripe, 680 pages in total need to be read), resulting in an additional read operation for every page to update, as well as additional XOR operations of every column. It is also realized that the read amplification gets worse as the stripe is fuller.

An alternative to reading the entire column from the drive is to save the column data which is optimal in terms of bandwidth and CPU consumption but is very wasteful in terms of SSD capacity.

Illustrative embodiments described in the above-cited U.S. patent application Ser. No. 16/049,185 overcome the above and other drawbacks associated with column parity data computations by utilizing processing capabilities of the storage devices (e.g., SSDs) themselves to perform at least a portion of the column parity data computations. For example, SSDs illustratively comprise flash drives that are equipped with processing capabilities such as, for example, an internal central processing unit (CPU) and/or a hardware accelerator unit, One or more such processing capabilities are referred to herein as "a processing device" of the SSD. As described in the above-cited U.S. patent application Ser. No. 16/049,185, such processing capabilities of the SSDs are used to perform operations over data in the drives without involving the host device (e.g., 102 in FIG. 1) or storage controllers (e.g., 108 in FIG. 1 or 208 in FIG. 2). The results of the operations performed by the internal processing capabilities of the SSDs are made available to the host device or storage controllers to perform further operations.

More particularly, optimization of the column calculations leverages SSD processing capabilities which, in turn, optimizes both the bandwidth to the drives, as well as saving the CPU of the host device or storage controller needed for calculating the column parity.

For each column (i.e., a column of blocks resides on a specific drive), a command (instruction) is sent from a parity data computation module (112 in host device 102 or module 212 in storage controller 208) to the given drive to calculate the XOR. result of all non-free pages in the column using internal CPU and/or hardware acceleration engines of the given drive. The result of the XOR operation is read from the given drive by the parity data computation module (112 or 212). Then, by combining the results read from the given drive with the new data to be written to the free space, the column XOR operation is completed. Additional details can be found in the above-cited U.S. patent application Ser. No. 16/049,185.

Additional illustrative embodiments will now be described. These embodiments may but need not utilize the above-described parity computation techniques, and can be implemented in a wide variety of other types of storage systems using different RAID and parity computation arrangements.

A first group of additional illustrative embodiments provides techniques for distributed generation of random data in a storage array or other type of storage system. In other embodiments of this type, the generated data need not be random data, but instead may be another type of data suitable for use in prefilling operations or other types of operations implemented within a storage system or associated host device.

In some embodiments, a distributed storage system comprises a cluster of storage nodes implementing a RAID array. The RAID array comprises one or more storage devices on each of the storage nodes, and each storage node is illustratively running software responsible for a portion of the compute power and drives of the RAID array. As indicated previously, conventional techniques for prefilling a RAID array with suitable amounts and types of data are inefficient and unduly time consuming.

This inefficiency is attributable to a number of different factors. For example, due to the additional parity calculation overhead, it takes longer to write a block in a RAID array that has previously been written to rather than a fresh, never written to block. In order for performance testing to reflect a system that has been in use for some time, all of the "free" blocks must have been written to in the past.

Also, when prefilling the physical stripes of the RAID array, it is desirable to generate random data blocks that are unique and uncompressible. However, this is an expensive operation, especially since the random data generated may be appropriate for a different storage node in the RAID array than the one that generates the random data.

In some embodiments, a content addressable storage system uses a hash on the data to determine the location of the data. In this case, data with a non-matching hash would need to be discarded and regenerated and the hash recalculated, which are costly operations. In a system with four hash domains (e.g., nodes or processes) the probability of generating the right data is 25%, and with a larger system this probability drops further.

The embodiments to be described below in conjunction with FIGS. 8, 9 and 10A-10D overcome the above-described problems of conventional approaches through distributed generation of data.

In some of these embodiments, a storage system comprises a plurality of storage nodes each comprising one or more storage devices, with each of the storage nodes further comprising a processor coupled to a memory. One or more of the storage nodes are each configured to generate data blocks for prefilling of at least a subset of the storage devices, to maintain a first portion of the generated data blocks in a pool of data blocks available in the given storage node for prefilling one or more of the storage devices of the given storage node, and to send a second portion of the generated data blocks from the given storage node to one or more other ones of the storage nodes for prefilling one or more other ones of the storage devices of the one or more other storage nodes. The first and second portions of the generated data blocks each illustratively comprise at least one generated data blocks.

The data blocks in some embodiments are randomly generated, although other arrangements are possible in other embodiments.

A given one of the storage nodes may be configured to monitor the pool of data blocks available in the given storage node for prefilling one or more of the storage devices of the given storage node, and responsive to the number of data blocks in the pool being at or below a designated threshold, to send a request to one or more of the other storage nodes for additional data blocks generated by the one or more other storage nodes. Each of the other storage nodes illustratively generates one or more of the additional data blocks and sends those one or more additional data blocks to the given storage node.

The given storage node in some embodiments computes a content-based signature for a particular one of the generated data blocks, and responsive to the computed content-based signature for the particular one of the generated data blocks being within a portion of a content-based signature space assigned to the given storage node, places the particular generated data block in the pool of data blocks available in the given storage node for prefilling one or more of the storage devices of the given storage node. Responsive to the content-based signature for the particular one of the generated data blocks not being within a portion of a content-based signature space assigned to the given storage node, the given storage node identifies another one of the storage nodes for which the content-based signature for the particular one of the generated data blocks is within a portion of the content-based signature space assigned to that other storage node, and sends the particular generated data block to that other storage node.

Figure 8:
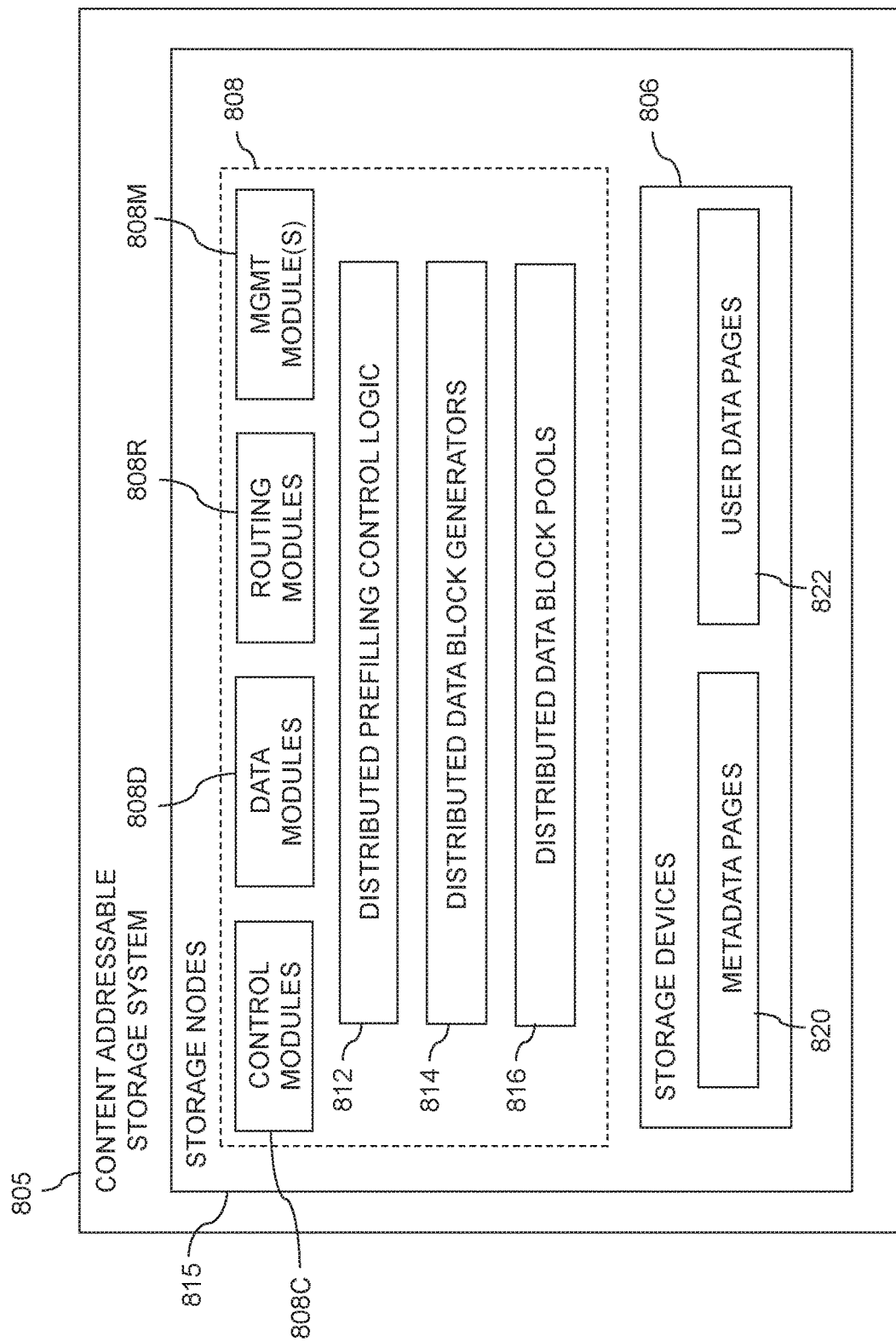
FIG. 8 is a block diagram of a content addressable storage system comprising a plurality of storage nodes configured to implement distributed generation of data for prefilling of storage devices in an illustrative embodiment.

Referring now to FIG. 8, an example storage system of the type described above is shown in more detail. This figure shows a content addressable storage system 805 comprising a plurality of storage devices 806 and an associated storage controller 808. The content addressable storage system 805 may be viewed as a particular implementation of a given one of the storage systems 105 or 205, and accordingly is assumed to be coupled to one or more host devices such as host device 102 or host devices 202. The content addressable storage system 805 is configured to implement functionality for distributed generation of data for prefilling of the storage devices 806 in an illustrative embodiment.

The storage controller 808 includes distributed modules 812, 814 and 816, illustratively distributed across a plurality of storage nodes 815 of the content addressable storage system 805. The content addressable storage system 805 in the FIG. 8 embodiment is therefore implemented as a clustered storage system comprising storage nodes 815 each of which comprises a corresponding subset of the storage devices 806. Other clustered storage system arrangements comprising multiple storage nodes and possibly additional or alternative nodes can be used in other embodiments. A given clustered storage system may therefore include not only storage nodes 815 but also additional storage nodes, compute nodes or other types of nodes coupled to a network such as network 104 or network 204. Alternatively, such additional storage nodes may be part of another clustered storage system of the system 100 or 200. Each of the storage nodes 815 of the storage system 805 is assumed to be implemented using at least one processing device comprising a processor coupled to a memory.

The distributed modules 812, 814 and 816 more particularly comprise distributed prefilling control logic 812, distributed data block generators 814, and distributed data block pools 816. It is assumed that each of the distributed modules 812, 814 and 816 comprises multiple module instances implemented on respective ones of the storage nodes 815. These module instances are further assumed to be part of the storage controller 808. The distributed modules 812, 814 and 816 collectively implement the distributed data generation and associated RAID array prefilling algorithm shown in the flow diagram of FIG. 9.

As indicated above, the storage controller 808 of the content addressable storage system 805 is implemented in a distributed manner so as to comprise a plurality of distributed storage controller components implemented on respective ones of the storage nodes 815. The storage controller 808 is therefore an example of what is more generally referred to herein as a "distributed storage controller." In subsequent description herein, the storage controller 808 is referred to as distributed storage controller 808.

Each of the storage nodes 815 in this embodiment further comprises a set of processing modules configured to communicate over one or more networks with corresponding sets of processing modules on other ones of the storage nodes 815. The sets of processing modules of the storage nodes 815 collectively comprise at least a portion of the distributed storage controller 808 of the content addressable storage system 805.

The modules of the distributed storage controller 808 in the present embodiment more particularly comprise different sets of processing modules implemented on each of the storage nodes 815. The set of processing modules of each of the storage nodes 815 comprises at least a control module 808C, a data module 808D and a routing module 808R. The distributed storage controller 808 further comprises one or more management ("MGMT") modules 808M. For example, only a single one of the storage nodes 815 may include a management module 808M. It is also possible that management modules 808M may be implemented on each of at least a subset of the storage nodes 815. A given set of processing modules implemented on a particular one of the storage nodes 815 therefore illustratively includes at least one control module 808C, at least one data module 808D and at least one routing module 808R, and possibly a management module 808M.

Terms such as "control module," "data module," "routing module" and "management module" as used herein are intended to be broadly construed, so as to encompass, for example, different processing modules of a server implemented by a storage node running on a processing device of a clustered storage system. It is also possible that such modules may comprise respective separate nodes or other separate processing devices of a clustered storage system.

Communication links may be established between the various processing modules of the distributed storage controller 808 using well-known communication protocols such as IP, Transmission Control Protocol (TCP), and remote direct memory access (RDMA). For example, respective sets of IP links used in data transfer and corresponding messaging could be associated with respective different ones of the routing modules 808R.

Although shown as separate modules of the distributed storage controller 808, the modules 812, 814 and 816 in some embodiments may be distributed at least in part over at least a subset of the other modules 808C, 808D, 808R and 808M of the storage controller 808. Accordingly, at least portions of the distributed data generation and associated RAID array prefilling functionality of the modules 812, 814 and 816 may be implemented in one or more of the other modules of the storage controller 808. In other embodiments, the modules 812, 814 and 816 may be implemented as stand-alone modules of the storage controller 808.

The storage devices 806 are configured to store metadata pages 820 and user data pages 822, and may also store additional information not explicitly shown such as checkpoints and write journals. The metadata pages 820 and the user data pages 822 are illustratively stored in respective designated metadata and user data areas of the storage devices 806. Accordingly, metadata pages 820 and user data pages 822 may be viewed as corresponding to respective designated metadata and user data areas of the storage devices 806.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 820 and the user data pages 822.

The user data pages 822 are part of a plurality of LUNs configured to store files, blocks, objects or other arrangements of data, each also generally referred to herein as a "data item," on behalf of users of the content addressable storage system 805. Each such LUN may comprise particular ones of the above-noted pages of the user data area. The user data stored in the user data pages 822 can include any type of user data that may be utilized in the system 100. The term "user data" herein is therefore also intended to be broadly construed.

A given storage volume for which content-based signatures are generated by storage controller 808 illustratively comprises a set of one or more LUNs, each including multiple ones of the user data pages 822 stored in storage devices 806.

The content addressable storage system 805 in the embodiment of FIG. 8 is configured to generate hash metadata providing a mapping between content-based digests of respective ones of the user data pages 822 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 822. The hash metadata generated by the content addressable storage system 805 is illustratively stored as metadata pages 820 in the metadata area. The generation and storage of the hash metadata is assumed to be performed under the control of the storage controller 808.

Each of the metadata pages 820 characterizes a plurality of the user data pages 822. For example, in a given set of n user data pages representing a portion of the user data pages 822, each of the user data pages is characterized by a LUN identifier, an offset and a content-based signature. The content-based signature is generated as a hash function of content of the corresponding user data page. Illustrative hash functions that may be used to generate the content-based signature include the SHA1 secure hashing algorithm, or other secure hashing algorithms known to those skilled in the art, including SHA2, SHA256 and many others. The content-based signature is utilized to determine the location of the corresponding user data page within the user data area of the storage devices 806.

Each of the metadata pages 820 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 820 in an illustrative embodiment comprises metadata pages having respective signatures, Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 805 is illustratively distributed among the control modules 808C.

The functionality for distributed data generation and associated RAID array prefilling provided by modules 812, 814 and 816 in some embodiments can be distributed across at least a subset of the processing modules 808C, 808D, 808R and 808M of the distributed storage controller 808.

In some embodiments, the content addressable storage system 805 comprises an XtremIO™ storage array suitably modified to incorporate functionality for distributed generation of data as disclosed herein.

In arrangements of this type, the control modules 808C, data modules 808D and routing modules 808R of the distributed storage controller 808 illustratively comprise respective C-modules, D-modules and R-modules of the XtremIO™ storage array. The one or more management modules 808M of the distributed storage controller 808 in such arrangements illustratively comprise a system-wide management module ("SYM module") of the XtremIO™ storage array, although other types and arrangements of system-wide management modules can be used in other embodiments. Accordingly, functionality for distributed data generation and associated RAID array prefilling in some embodiments is implemented under the control of at least one system-wide management module of the distributed storage controller 808, utilizing the C-modules, D-modules and R-modules of the XtremIO™ storage array.

In the above-described XtremIO™ storage array example, each user data page has a fixed size such as 8 KB and its content-based signature is a 20-byte signature generated using the SHA1 secure hashing algorithm. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 808C such that control of the slices within the storage controller 808 of the storage system 805 is substantially evenly distributed over the control modules 808C of the storage controller 808.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 805 each illustratively comprise one or more IO operations directing that at least one data item of the storage system 805 be written to in a particular manner. A given write request is illustratively received in the storage system 805 from a host device over a network. In some embodiments, a write request is received in the distributed storage controller 808 of the storage system 805, and directed from one processing module to another processing module of the distributed storage controller 808. For example, a received write request may be directed from a routing module 808R of the distributed storage controller 808 to a particular control module 808C of the distributed storage controller 808. Other arrangements for receiving and processing write requests from one or more host devices can be used.

The term "write request" as used herein is intended to he broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 815 communicate with one another over a high-speed internal network such as an InfiniBand network. The C-modules, D-modules and R-modules coordinate with one another to accomplish various IO processing tasks.

The write requests from the host devices identify particular data pages to be written in the storage system 805 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle. The hash digest and the hash handle are each considered examples of what are more generally referred to herein as content-based signatures of a given data page. The hash digest and hash handle of a given data page are also referred to as simply a "hash" of that data page. The data pages are examples of what are more generally referred to herein as "data blocks."

Referring now to FIG. 9, an example process for distributed generation of data for prefilling of a RAID array comprising at least a portion of the storage devices 806 of the content addressable storage system 805 is shown. It should be noted that the term "RAID array" as used herein is intended to be broadly construed, so as to encompass any storage system that utilizes a RAID arrangement to distribute data across multiple storage devices. The process in this embodiment comprises an example algorithm collectively implemented by the distributed modules 812, 814 and 816. The process includes steps 900 through 918, which are collectively performed by different instances of the modules 812, 814 and 816 deployed on respective ones of the storage nodes 815.

The steps are more particularly performed by a particular one of the storage nodes, denoted as a "first storage node," through interaction with other ones of the storage nodes. It is assumed that each of the other storage nodes also performs operations similar to those performed by the first storage node.

Moreover, although steps 900-918 are shown in the figure as being performed in a particular sequence, this is by way of example only, for clarity and simplicity of illustration, and different ones of the steps or sets of the steps can instead be performed concurrently, or otherwise performed in an asynchronous manner relative to one another. The particular configuration of the flow diagram should therefore not be viewed as indicating that synchronous performance of steps 900-918 is required.

References to storage nodes in the following description of the FIG. 9 process illustratively refer to particular ones of the storage nodes 815, and references to storage devices illustratively refer to subsets of storage devices 806 associated with different ones of the storage nodes 815, although numerous other arrangements of storage nodes and associated storage devices are possible in other embodiments.

In step 900, the first storage node generates a data block for prefilling of the subset of storage devices associated with that storage node. It is assumed that the storage devices do not contain any user data pages prior to the prefilling of those storage devices, although other arrangements are possible. The term "prefilling" as used herein is therefore intended to be broadly construed, so as to encompass, for example, arrangements in which storage devices that may contain some amount of data are filled with additional data. Also, the prefilling need not be to a full capacity of the storage devices, but can instead be, for example, to some designated percentage of the full capacity.

The data blocks referred to in this embodiment are assumed to comprise respective random data blocks. The term "random" as used herein is intended to be broadly construed, so as to encompass pseudorandom arrangements, in which data blocks are generated using a pseudorandom number generator (PRNG) or other similar type of data generation circuitry well known to those skilled in the art. Other embodiments generate data blocks that are not random data blocks. For example, some embodiments disclosed herein perform prefilling of a RAID array using data blocks that are read from storage devices of the storage nodes, rather than randomly generated by the storage nodes.

In step 902, the first storage node generates a hash of the data block. In some embodiments, the data block comprises a data page of the type described elsewhere herein. As indicated previously, the hash can refer to a hash digest or a hash handle, or other type of content-based signature of the data block. Other types of data blocks can be used in other embodiments, and the term "data block" as used herein should therefore not be viewed as being limited to a data page or other particular size or type of block.

In step 904, a determination is made as to whether or not the hash of the data block falls within a particular portion of a hash space of the storage system, where the particular portion is the portion of the hash space assigned to the first storage node. The hash space is an example of what is more generally referred to herein as a "content-based signature space" of the storage system. In some embodiments, different portions of a logical address space of the storage system are assigned to respective different ones of the control modules of the storage nodes, and different portions of a content-based signature space of the storage system are assigned to respective different ones of the data modules of the storage nodes. Numerous other arrangements involving assignments of different portions of logical address spaces and content-based signature spaces of a storage system to different storage nodes of the storage system can be used in other embodiments. The "hash space" can comprise, for example, a hash digest space or a hash handle space, or other type of designated hash space. If the hash of the data block falls within the particular portion of the hash space assigned to the first storage node, the process moves to step 906, and otherwise moves to step 908 as indicated.

In step 906, the first storage node adds the data block to a pool of available data blocks maintained by the first storage node. Such data blocks are "appropriate" for the first storage node because they have respective hashes that fall within the assigned portion of the hash space. The data blocks in the pool maintained by the first storage node are therefore available for use by the first storage node in prefilling storage devices of that storage node. The process then moves to step 910 as indicated.

In step 908, which is reached responsive to a mismatch between the hash of the data block and the portion of the hash space assigned to the first storage node, the first storage node sends the data block to another storage node for which the hash of the data block falls within the portion of the hash space assigned to that storage node. In other words, if the first storage node determines in step 904 that the data block generated in step 900 is appropriate not for itself, but is instead appropriate for another one of the storage nodes, the first storage node sends the data block to that other storage node. It is therefore assumed in this embodiment that each of the storage nodes of the storage system maintains a separate pool of generated data blocks for prefilling its corresponding storage devices. Each of these separate pools stores data blocks that are appropriate for its corresponding storage node, namely, data blocks having respective hashes that fall within its corresponding assigned portion of the hash space of the storage system. A given such data block may be generated by the corresponding storage node, or received from another one of the storage nodes. After completion of step 908, the process returns to step 900 in which the first storage node generates another data block.

In step 910, the first storage node receives one or more data blocks that were generated by one or more other storage nodes but have hashes falling within the hash space assigned to the first storage node. The first storage node adds any such data blocks received from other storage nodes to its pool of available data blocks. Each of the other storage nodes is assumed to operate in a similar manner with respect to any data blocks received from the first storage node or another one of the storage nodes, in that it adds any such received data blocks to its pool of available data blocks.

In step 912, a determination is made as to whether or not the pool of available data blocks maintained by the first storage node contains at least a threshold number of data blocks. The threshold number of data blocks can be determined based on the particular prefilling context in order to ensure that desired prefilling targets or levels of "fullness" of the storage devices can be achieved in a highly efficient manner. If the pool includes at least the threshold number of data blocks, the process moves to step 914, and otherwise moves to step 916 as indicated.

In step 914, during a prefill cycle in which the storage nodes prefill their associated storage nodes using available data blocks from their respective pools, the first storage node utilizes data blocks from its pool to prefill its storage devices. The process then moves to step 918.

In step 916, which is reached if the determination in step 912 indicates that the pool maintained by the first storage node does not include at least the threshold number of data blocks, the first storage node notifies other storage nodes that additional data blocks are needed by the first storage node. After completion of step 916, the process returns to step 900 in which the first storage node generates another data block.

In step 918, a determination is made as to whether or not the current prefill cycle is complete. Completion of the current prefill cycle illustratively indicates that the storage nodes have prefilled their associated storage devices to desired prefilling targets or levels of fullness. If the prefill cycle is not complete, the process returns to step 912 to once again test the sufficiency of the pool of available data blocks. If the prefill cycle is complete, the process ends as indicated. One or more additional prefill cycles can be executed through repetition of the FIG. 9 process, possibly at certain predetermined intervals or responsive to occurrence of particular designated events.

As noted above, operations referred to above as being performed by the first storage node are similarly performed by other ones of the storage nodes.

Again, the sequential nature of the flow diagram should not be viewed as requiring that the steps be performed synchronously. Instead, asynchronous performance of these steps is contemplated in many implementations. For example, different sets of the steps, such as sets comprising steps {900-906}, {910}, {912-916} and {914-918} can be performed as respective asynchronous tasks.

In one example implementation of the FIG. 9 process, in conjunction with a given prefill cycle, each of the storage nodes maintains a pool of data blocks that are appropriate for itself, as the data blocks of the pool of each storage node have hashes that fall within its corresponding assigned portion of the hash space. When the pool maintained by a given one of the storage nodes becomes low, that storage node will communicate to all of the other storage nodes that it needs additional data blocks. In this manner, when any of the storage nodes requires additional data blocks, all of the storage nodes will generate data blocks in parallel. When each data block is generated, the appropriate storage node for that data block is determined and the data block will either be added to the pool of the generating storage node if that storage node is the appropriate storage node for the data block, or it will be sent to the appropriate storage node and added to the pool maintained by that storage node. The pools of data blocks maintained by the storage nodes are drawn on as needed by the prefill task.

These and other example implementations of the FIG. 9 process advantageously avoid the difficulties that would otherwise be associated with each of the storage nodes generating multiple random blocks, and discarding inappropriate ones of those random blocks, until a sufficient number of random blocks are generated that are appropriate for the particular generating storage node. Instead, such implementations are configured such that every generated data block is utilized by one of the storage nodes, while also significantly reducing the total number of hash computations required.

Illustrative embodiments of storage systems with distributed data generation and associated RAID array prefilling as disclosed herein can therefore provide a number of significant advantages relative to arrangements such as independent and separate generation of random data by each storage node to prefill its storage devices, or prefilling storage devices with random data generated by one or more host devices.

The particular processing operations and other system functionality described above in conjunction with the flow diagram of FIG. 9 are presented by way of illustrative example only, and should not be construed as limiting the scope of the disclosure in any way. Alternative embodiments can use other types of processing operations for implementing distributed data generation and associated RAID array prefilling in a storage system. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to support multiple instances of distributed data generation and associated RAID array prefilling for multiple storage systems or different portions of a single storage system.

Functionality such as that described in conjunction with the flow diagram of FIG. 9 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

A storage controller such as distributed storage controller 808 that is configured to control performance of one or more steps of the process of the flow diagram of FIG. 9 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The host devices 102 or 202 and content addressable storage system 805, as well as other system components, may be implemented at least in part using processing devices of such processing platforms. For example, in the distributed storage controller 808, respective distributed modules can be implemented in respective containers running on respective ones of the processing devices of a processing platform.

The FIG. 9 process makes use of various metadata structures that are maintained within the content addressable storage system 805. Examples of metadata structures maintained by the storage system in illustrative embodiments include the logical layer and physical layer mapping tables shown in respective FIGS. 10A, 10B, 10C and 10D. It is to be appreciated that these particular tables are only examples, and other tables or metadata structures having different configurations of entries and fields can be used in other embodiments.

Referring initially to FIG. 10A, an address-to-hash ("A2H") table 1000 is shown. The A2H table 1000 comprises a plurality of entries accessible utilizing logical addresses denoted Logical Address 1, Logical Address 2, . . . Logical Address M as respective keys, with each such entry of the A2H table 1000 comprising a corresponding one of the logical addresses, a corresponding one of the hash handles, and possibly one or more additional fields.

FIG. 10B shows a hash-to-data ("H2D") table 1002 that illustratively comprises a plurality of entries accessible utilizing hash handles denoted Hash Handle 1, Hash Handle 2, . . . Hash Handle D as respective keys, with each such entry of the H2D table 1002 comprising a corresponding one of the hash handles, a physical offset of a corresponding one of the data pages, and possibly one or more additional fields.

Referring now to FIG. 10C, a hash metadata ("HMD") table 1004 comprises a plurality of entries accessible utilizing hash handles denoted Hash Handle 1, Hash Handle 2, . . . Hash Handle H as respective keys. Each such entry of the HMD table 1004 comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. Although not explicitly so indicated in the figure, the HMD table 1004 may also include one or more additional fields.

In the present embodiment, the HMD table of FIG. 10C illustratively comprises at least a portion of the same information that is found in the H2D table of FIG. 10B. Accordingly, in other embodiments, those two tables can be combined into a single table, illustratively referred to as an H2D table, an HMD table or another type of physical layer mapping table providing a mapping between hash values, such as hash handles or hash digests, and corresponding physical addresses of data pages.

FIG. 10D shows a physical layer based ("PLB") table 1006 that illustratively comprises a plurality of entries accessible utilizing physical offsets denoted Physical Offset 1, Physical Offset 2, . . . Physical Offset P as respective keys, with each such entry of the PLB table 1006 comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length.

Collisions can arise where data pages with different content nonetheless have the same hash handle. This is a possibility in embodiments that utilize hash handles rather than full hash digests to identify data pages. Unlike the full hash digests which are generated using collision-resistant hash functions that can essentially guarantee unique hash digests for data pages with different content, the hash handles can in some cases with very small probability lead to collisions. The hash handle lengths and their manner of generation should therefore be selected so as to ensure that the collision probability is at or below a maximum acceptable level for the particular implementation.

It is to be appreciated that terms such as "table" and "entry" as used herein are intended to be broadly construed, and the particular example table and entry arrangements of FIGS. 10A through 10D can be varied in other embodiments. For example, additional or alternative arrangements of tables and entries can be used.

The content addressable storage system 805 utilizes a two-level mapping process to map logical block addresses to physical block addresses. For example, the first level of mapping illustratively uses the A2H table and the second level of mapping uses the HMD table, with the A2H and HMD tables corresponding to respective logical and physical layers of the content-based signature mapping within the content addressable storage system 805. The HMD table or a given portion thereof in some embodiments disclosed herein is more particularly referred to as an H2D table.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 106. This is also referred to as physical layer mapping.

Examples of these and other metadata structures utilized in illustrative embodiments include the A2H, H2H, HMD and PLB tables of respective FIGS. 10A through 10D. In some embodiments, the A2H and H2D tables are utilized primarily by the control modules 808C, while the HDM and PLB tables are utilized primarily by the data modules 808D.

For a given write request, hash metadata comprising at least a subset of the above-noted tables is updated in conjunction with the processing of that write request.

The A2H, H2H, HMD and PLB tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the content addressable storage system 805. It should be noted that additional or alternative metadata structures can be used in other embodiments. References herein to particular tables of particular types, such as A2H, H2D, MMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the storage system 805 correspond to respective physical blocks of a physical layer of the storage system 805. The user data pages of the logical layer are organized by LBA and have reference via respective content-based signatures to particular physical blocks of the physical layer.

Each of the physical blocks has an associated reference count that is maintained within the storage system 805. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 808C, 808D, 808R and 808M as shown in the FIG. 8 embodiment is presented by way of example only. Numerous alternative arrangements of processing modules of a distributed storage controller may be used to implement functionality for distributed generation of data in a clustered storage system in other embodiments.

Additional examples of content addressable storage functionality implemented in some embodiments by control modules 808C, data modules 808D, routing modules 808R and management module(s) 808M of distributed storage controller 808 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

A second group of additional illustrative embodiments provides automatic prefill of a storage array or other type of storage system with conditioning of RAID stripes.

In a given embodiment of this type, a number of volumes with a size and desired fill percentage is specified. From that specification, a calculation is made of the total physical space that will be in use once those volumes are created. From this, a determination is made of the number of blocks that should be used or free within each RAID stripe.

An automatic process will then process each stripe. For each stripe it will fill the appropriate number of free blocks and put them into the stripe parity calculation. It will also assure that the remaining free blocks are included in the parity calculation as well. The prefilled blocks of each stripe are now placed on a list of available blocks.

For each specified volume, a separate automatic process will then make requests for random data to fill each volume to the specified percentage. When requesting the random data, it will consume the prefilled blocks that were created from the stripe prefill process.

An embodiment of this type can be implemented, for example, in the content addressable storage system 805 of FIG. 8 utilizing its storage nodes 815 each comprising one or more of the storage devices 806. The storage system 805 in such an embodiment is configured to prefill a given stripe across multiple ones of the storage devices 806 with data blocks to a first fullness level, to designate at least a subset of the prefilled data blocks of the stripe as available for use in prefilling one or more logical storage volumes of the storage system 805, and to prefill a given one of the logical storage volumes to a second fullness level utilizing selected ones of the available data blocks.

The given stripe across multiple ones of the storage devices illustratively comprises a RAID stripe of the type as described elsewhere herein, although other types of striping arrangements can be used.

In some embodiments, the first and second fullness levels are the same, although different first and second fullness levels can be used in other embodiments. At least one of the first and second fullness levels is illustratively specified as a percentage fullness, although other fullness measures can be used.

In some embodiments, the storage system 805 is further configured to determine sizes of the one or more logical storage volumes, and to compute the first fullness level based at least in part on the determined sizes of the one or more logical storage volumes.

Additionally or alternatively, the storage system 805 in some embodiments is illustratively configured to determine from the first fullness level a number of free data blocks to be included within the given stripe, and to prefill the given stripe based at least in part on the determined number of free data blocks.

The prefilling of the given stripe in illustrative embodiments is configured to ensure that each of the free data blocks has been written to at least one time. The storage system 805 is further configured to include each of the prefilled data blocks of the given stripe in at least one parity computation. As indicated above, the prefilling of the given stripe and the prefilling of the given logical storage volume in some embodiments are implemented as respective separate automatic processes.

Such arrangements advantageously avoid the difficulties that would otherwise be associated with writing and overwriting each in-use data block from a front-end host or hosts until every block in the storage array has been written to at least once, leaving no blocks that have never been written to.

A third group of additional illustrative embodiments provides prefill of RAID stripes in a storage array or other type of storage system by reading of existing data.

Reading of data from storage drives generally occurs much faster than writing of the drives. For each RAID stripe, we read the blocks that are desired to be filled. Based on the content of each block, we can determine which node this block is designated for. After the appropriate node is determined and if the block is appropriate for this node, we mark the block as used and include it in parity calculation. If the block is not appropriate for this node, we transmit the block to the appropriate node. This results in significant performance increase due to the fact that transmitting a block to another node is faster than generating a new random block that meets the criteria for this node. Each node maintains a queue of blocks received from other nodes, and can draw on this queue to when it needs a random block.

An embodiment of this type can be implemented, for example, in the content addressable storage system 805 of FIG. 8 utilizing its storage nodes 815 each comprising one or more of the storage devices 806. At least a given one of the storage nodes 815 is configured to read data blocks from its one or more storage devices, and for a given one of the data blocks, to determine based at least in part on a content-based signature of that data block whether or not the given data block is appropriate for use in a prefilling operation of the given storage node. Responsive to the given data block being appropriate for use in the prefilling operation of the given storage node, the given storage node uses the data block in the prefilling operation of the given storage node, and responsive to the given data block not being appropriate for use in the prefilling operation of the given storage node, the given storage node sends the data block to another one of the storage nodes for use in a prefilling operation of that other storage node.

Also by way of example, embodiments of the type described above can be implemented using a process similar to that of FIG. 9, but with the first storage node reading the data blocks from its one or more storage devices, rather than generating those data blocks using a PRNG or other type of data block generation circuitry. References herein to "distributed generation of data" should be understood to encompass arrangements that generate data in a distributed manner by reading data blocks from storage devices.

In some embodiments, the given storage node in reading data blocks from its one or more storage devices is further configured to read the data blocks from at least one designated RAID stripe. Other embodiments can utilize other techniques for reading data blocks from storage devices.

The given storage node in some embodiments is further configured to compute content-based signatures for the respective data blocks. For at least one of the data blocks having a content-based signature that is within a portion of a content-based signature space assigned to the given storage node, the given storage node designates the data block as appropriate for use in the prefilling operation of the given storage node. For at least one of the data blocks having a content-based signature that is not within a portion of a content-based signature space assigned to the given storage node, the given storage node designates the data block as not appropriate for use in the prefilling operation of the given storage node.

In some embodiments, the given storage node is further configured to send the data block to another one of the storage nodes for which the content-based signature for the data block is within a portion of the content-based signature space assigned to that other storage node.

For a particular one of the data blocks that is appropriate for use in the prefilling operation of the given storage node, the given storage node is illustratively configured to use the particular data block in the prefilling operation, to mark the particular data block as used, and to include the particular data block in a parity computation, such as a parity computation of the type described elsewhere herein.

In some embodiments, the given storage node is further configured to maintain a pool of data blocks received from other ones of the storage nodes and determined by those other storage nodes to be appropriate for use in the prefilling operation of the given storage node. Each of the other storage nodes also maintains a pool of data blocks received from other ones of the storage nodes.

The content-based signatures are illustratively part of a designated content-based signature space of the storage system 805, with different portions of the content-based signature space of the storage system 805 being assigned to respective different ones of the storage nodes 815. As indicated previously, the content-based signature space of the storage system 805 illustratively comprises one of a hash handle space of the storage system and a hash digest space of the storage system 805.

Such arrangements advantageously avoid the difficulties that would otherwise be associated with the given storage node having to provide all of the data blocks for prefilling that storage node, or requiring that all of the data blocks for prefilling the given storage node be written to that storage node from one or more front-end hosts.

The above-described first, second and third groups of embodiments can be utilized for prefilling of storage arrays or other types of storage systems for purposes of performance testing, quality assurance testing or other types of testing, as well as for other purposes, and can be implemented in automated tools deployed within the storage array for such purposes. It is generally desirable to test the storage array under specified conditions of sufficient "fullness" of the storage array, and these embodiments greatly facilitate the establishment of such conditions. As indicated previously, random data referred to in these and other embodiments herein can be generated at least in part using PRNGs or other circuitry or techniques for producing random or pseudorandom data. Other embodiments need not utilize random data, but can instead utilize other types of data, such as existing data read from storage devices.

The above-described embodiments can be implemented in storage systems of the type described elsewhere herein, and accordingly are not limited to use in content addressable storage systems. Again, a wide variety of different RAID and parity computation arrangements can be used.

In some embodiments, the storage system comprises an XtremIO™ storage array or other type of content addressable storage system suitably modified to incorporate functionality for distributed data generation and associated prefilling of RAID stripes as disclosed herein.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for parity data computation will now be described in greater detail with reference to FIGS. 11 and 12. Although described in the context of system 100, these platforms may also be used to implement at least portions of other information processing systems in other embodiments.

Figure 11:
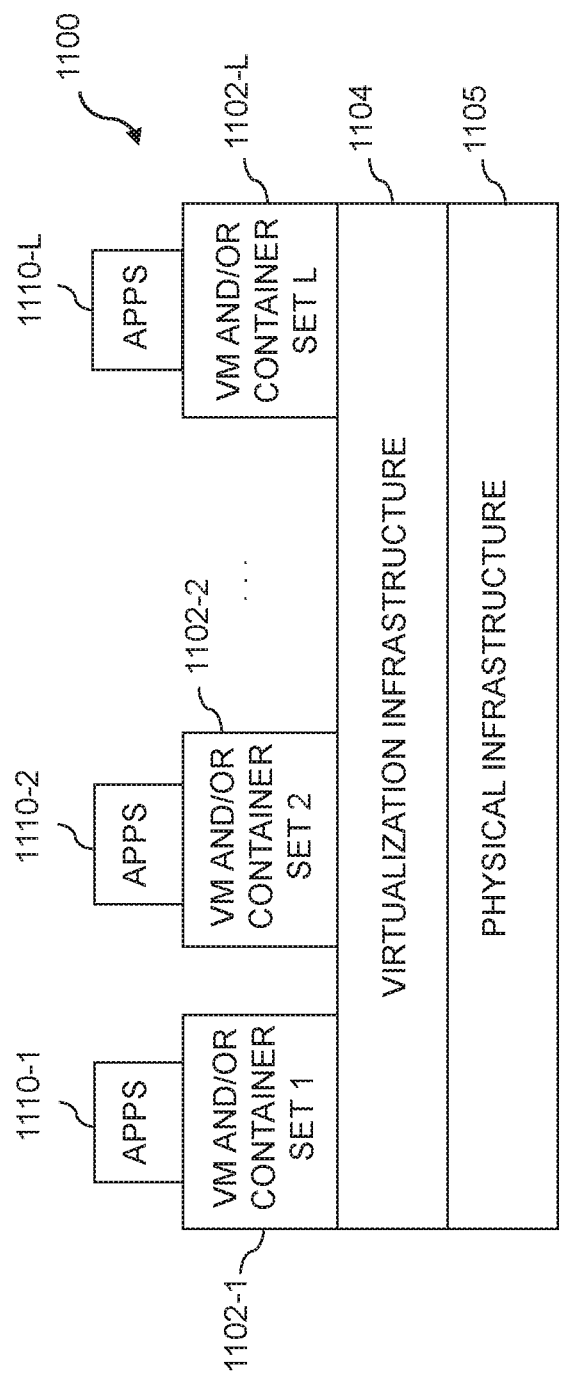
FIGS. 11 and 12 show examples of processing platforms that may be utilized to implement at least a portion of an information processing system in illustrative embodiments.
Figure 12:
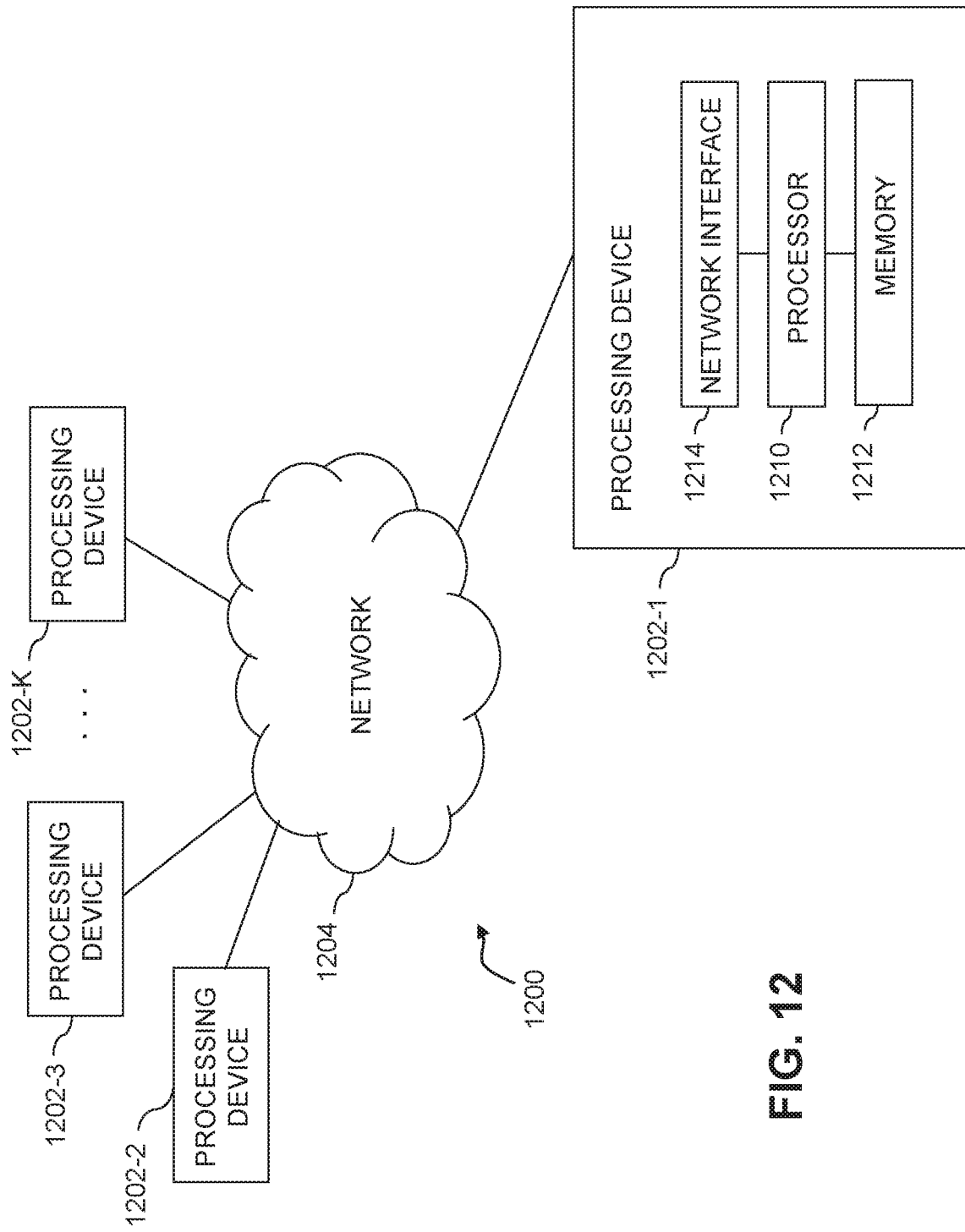

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises multiple virtual machines (VMs) and/or container sets 1102-1, 1102-2, . . . 102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. Such implementations can provide functionality for distributed data generation and associated RAID array prefilling using processes running on one or more of the VMs. For example, each of the VMs can implement such functionality using one or more processes running on that particular VW.

An example of a hypervisor platform that may be used to implement a hypervisor within the virtualization infrastructure 1104 is the VMware® vSphere® which may have an associated virtual infrastructure management system such as the VMware® vCenter™. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system. Such implementations can provide functionality for distributed data generation and associated RAID array prefilling using processes running on different ones of the containers. For example, a container host device supporting multiple containers of one or more container sets can implement one or more instances of such functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 or 200 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA) or other type of processing circuitry, as well as portions or combinations of such circuitry elements.

The memory 1212 may comprise random access memory (RA), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 or 200 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for distributed data generation and associated RAID array prefilling as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, RAID arrangements, and techniques for distributed data generation and associated RAID array prefilling. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage nodes each comprising one or more storage devices;
each of the storage nodes further comprising a processor coupled to a memory;
at least a given one of the storage nodes being configured:
to read data blocks from its one or more storage devices;
for a given one of the data blocks, to determine based at least in part on a content-based signature of that data block whether or not the given data block is appropriate for use in a prefilling operation of the given storage node;
responsive to the given data block being appropriate for use in the prefilling operation of the given storage node, to use the data block in the prefilling operation of the given storage node; and
responsive to the given data block not being appropriate for use in the prefilling operation of the given storage node, to send the data block to another one of the storage nodes for use in a prefilling operation of that other storage node.

2. The apparatus of claim 1 wherein the storage system is configured to store the data blocks across the storage devices of the storage nodes utilizing a redundant array of independent disks (RAID) arrangement.

3. The apparatus of claim 2 wherein the RAID arrangement includes parity information supporting at least one recovery option for reconstructing the data blocks of at least one of the storage devices responsive to a failure of that storage device.

4. The apparatus of claim 1 wherein each of the storage nodes further comprises a set of processing modules configured to communicate over one or more networks with corresponding sets of processing modules on other ones of the storage nodes.

5. The apparatus of claim 4 wherein the sets of processing modules comprise respective servers that collectively implement at least a portion of a distributed storage controller of the storage system.

6. The apparatus of claim 4 wherein the sets of processing modules of the storage nodes each comprise at least one data module and at least one control module.

7. The apparatus of claim 1 wherein the given storage node in reading data blocks from its one or more storage devices is further configured to read the data blocks from at least one designated RAID stripe.

8. The apparatus of claim 1 wherein the given storage node is further configured:
to compute content-based signatures for the respective data blocks;
for at least one of the data blocks having a content-based signature that is within a portion of a content-based signature space assigned to the given storage node, to designate the data block as appropriate for use in the prefilling operation of the given storage node; and
for at least one of the data blocks having a content-based signature that is not within a portion of a content-based signature space assigned to the given storage node, to designate the data block as not appropriate for use in the prefilling operation of the given storage node.

9. The apparatus of claim 8 wherein the given storage node is further configured to send the data block to another one of the storage nodes for which the content-based signature for the data block is within a portion of the content-based signature space assigned to that other storage node.

10. The apparatus of claim 1 wherein the given storage node is further configured, for a particular one of the data blocks that is appropriate for use in the prefilling operation of the given storage node:
to use the particular data block in the prefilling operation;
to mark the particular data block as used; and
to include the particular data block in a parity computation.

11. The apparatus of claim 1 wherein the given storage node is further configured to maintain a pool of data blocks received from other ones of the storage nodes and determined by those other storage nodes to be appropriate for use in the prefilling operation of the given storage node.

12. The apparatus of claim 11 wherein each of the other storage nodes also maintains a pool of data blocks received from other ones of the storage nodes.

13. The apparatus of claim 1 wherein the content-based signatures are part of a designated content-based signature space of the storage system and wherein different portions of the content-based signature space of the storage system are assigned to respective different ones of the storage nodes.

14. The apparatus of claim 13 wherein the content-based signature space of the storage system comprises one of a hash handle space of the storage system and a hash digest space of the storage system.

15. A method comprising:
configuring a storage system to include a plurality of storage nodes each comprising one or more storage devices, each of the storage nodes further comprising a processor coupled to a memory;
reading data blocks from the one or more storage devices of a given one of the storage nodes;
for a given one of the data blocks, determining based at least in part on a content-based signature of that data block whether or not the given data block is appropriate for use in a prefilling operation of the given storage node;
responsive to the given data block being appropriate for use in the prefilling operation of the given storage node, using the data block in the prefilling operation of the given storage node; and
responsive to the given data block not being appropriate for use in the prefilling operation of the given storage node, sending the data block to another one of the storage nodes for use in a prefilling operation of that other storage node.

16. The method of claim 15 further comprising:
computing content-based signatures for the respective data blocks;
for at least one of the data blocks having a content-based signature that is within a portion of a content-based signature space assigned to the given storage node, designating the data block as appropriate for use in the prefilling operation of the given storage node; and
for at least one of the data blocks having a content-based signature that is not within a portion of a content-based signature space assigned to the given storage node, designating the data block as not appropriate for use in the prefilling operation of the given storage node.

17. The method of claim 15 further comprising, for a particular one of the data blocks that is appropriate for use in the prefilling operation of the given storage node:
using the particular data block in the prefilling operation of the given storage node;
marking the particular data block as used; and
including the particular data block in a parity computation.

18. A computer program product comprising a non-transitory processor-readable storage medium having stored therein program code of one or more software programs, wherein the program code when executed by a storage system comprising a plurality of storage nodes each comprising one or more storage devices, each of the storage nodes further comprising a processor coupled to a memory, causes the storage system:
to read data blocks from the one or more storage devices of a given one of the storage nodes;
for a given one of the data blocks, to determine based at least in part on a content-based signature of that data block whether or not the given data block is appropriate for use in a prefilling operation of the given storage node;
responsive to the given data block being appropriate for use in the prefilling operation of the given storage node, to use the data block in the prefilling operation of the given storage node; and
responsive to the given data block not being appropriate for use in the prefilling operation of the given storage node, to send the data block to another one of the storage nodes for use in a prefilling operation of that other storage node.

19. The computer program product of claim 18 wherein the program code when executed by the storage system further causes the storage system:
to compute content-based signatures for the respective data blocks;
for at least one of the data blocks having a content-based signature that is within a portion of a content-based signature space assigned to the given storage node, to designate the data block as appropriate for use in the prefilling operation of the given storage node; and
for at least one of the data blocks having a content-based signature that is not within a portion of a content-based signature space assigned to the given storage node, to designate the data block as not appropriate for use in the prefilling operation of the given storage node.

20. The computer program product of claim 18 wherein the program code when executed by the storage system further causes the storage system, for a particular one of the data blocks that is appropriate for use in the prefilling operation of the given storage node:
to use the particular data block in the prefilling operation of the given storage node;

to mark the particular data block as used; and
to include the particular data block in a parity computation.

\* \* \* \* \*